United States Patent [19]
Loke et al.

[11] Patent Number: 5,629,976
[45] Date of Patent: May 13, 1997

[54] TELCO-LESS CT-2 BASE

[76] Inventors: Wai S. Loke, No. 25 Victoria Park Road, Singapore, Singapore, 1026; Chee T. Tai, No. 94 Pemimpin Terrace, Singapore, Singapore, 2057

[21] Appl. No.: 376,984

[22] Filed: Jan. 23, 1995

[51] Int. Cl.$^6$ ............................................. H04Q 7/30
[52] U.S. Cl. ....................................... 379/61; 379/58
[58] Field of Search ................................ 379/58, 59, 61

[56] References Cited

U.S. PATENT DOCUMENTS

| | | | |
|---|---|---|---|
| 5,010,565 | 4/1991 | Nash et al. | 379/61 |
| 5,241,587 | 8/1993 | Horton et al. | 379/92 |
| 5,349,701 | 9/1994 | Lobel | 455/222 |

OTHER PUBLICATIONS

Motorola, Inc., Silverlink 2010 and 2020 Personal Base Stations CT2/CAI Compatible Brochure, 1990.

*Primary Examiner*—Curtis Kuntz
*Assistant Examiner*—Nay Aung Maung

[57] ABSTRACT

A converter incorporates all the elements of a conventional base station, except for the integral TELCO interface. A separate TELCO interface (140) is made accessible to the converter (120) through a telephone port (424) which is connected to a conventional telephone base (240).

7 Claims, 4 Drawing Sheets

—PRIOR ART—

TELCO-LESS CT-2 BASE

FIELD OF THE INVENTION

This invention relates in general to radio communications, and in particular to an apparatus to transform a conventional phone into a CT-2 base.

BACKGROUND OF THE INVENTION

The second generation cordless telephone (CT-2) Common Air Interface (CAI) describes the protocol for transmitting and receiving digitized audio and control data for second generation cordless telephones. A CT-2 handset receives an analog speech signal via a microphone, converts the analog speech signal into a digital speech signal, compresses the digital speech signal, modulates the compressed signal at a radio frequency, and transmits the modulated RF signal through an antenna. The transmitted RF signal is received by a nearby base station where it may be converted to an analog signal or remain in digital form for digital switching equipment. Ultimately, the signal is relayed to the destination telephone. When a similar signal is received from the destination telephone, the telephone signal undergoes the same process in reverse. The base station transmits a digital RF signal to the handset which is received via the antenna, demodulated, decompressed, and converted into an analog speech signal which drives a speaker in the handset.

The data is transmitted in one millisecond bursts every two milliseconds with each frame containing sixteen four-bit adaptive differential pulse code modulated (ADPCM) samples and either two or four bits of control data. Transmit and receive signals are sent and received to and from the base station in packets in a ping-pong fashion. CAI specifies that a part of the packet includes signalling information including such things as call setup and termination requests and handshaking information. For signal reception, a packet is received, demodulated, processed through a ADPCM decoder, converted from digital PCM to analog, and then provided to a speaker. In the CT-2 cordless telephone system, the handset establishes a digital link with the base station. The link is normally maintained until the call is completed.

Conventional CT-2 bases already have a telephone company (TELCO) interface for coupling the digital signal to digital switching equipment for relaying to the destination telephone. However, to sell a product having a TELCO interface requires stringent product testing and type approval from telecommunication standards setting entities.

Thus, what is needed is a CT-2 base suitable for use with a conventional telephone having a conventional TELCO interface already so that type approval is not necessary for the CT-2 base itself.

SUMMARY OF THE INVENTION

In carrying out the advantages of the invention in one form, there is provided a CT-2 base telephone converter. The converter includes a CT-2 transceiver for transforming a modulated RF signal into a digital signal. A PCM codec receives the digital signal for decoding the digital signal into an analog telephone signal and a PCM codec port couples the analog telephone signal to a TELCO interface of a separate telephone base.

DETAILED DESCRIPTION OF THE INVENTION

Figure 1:
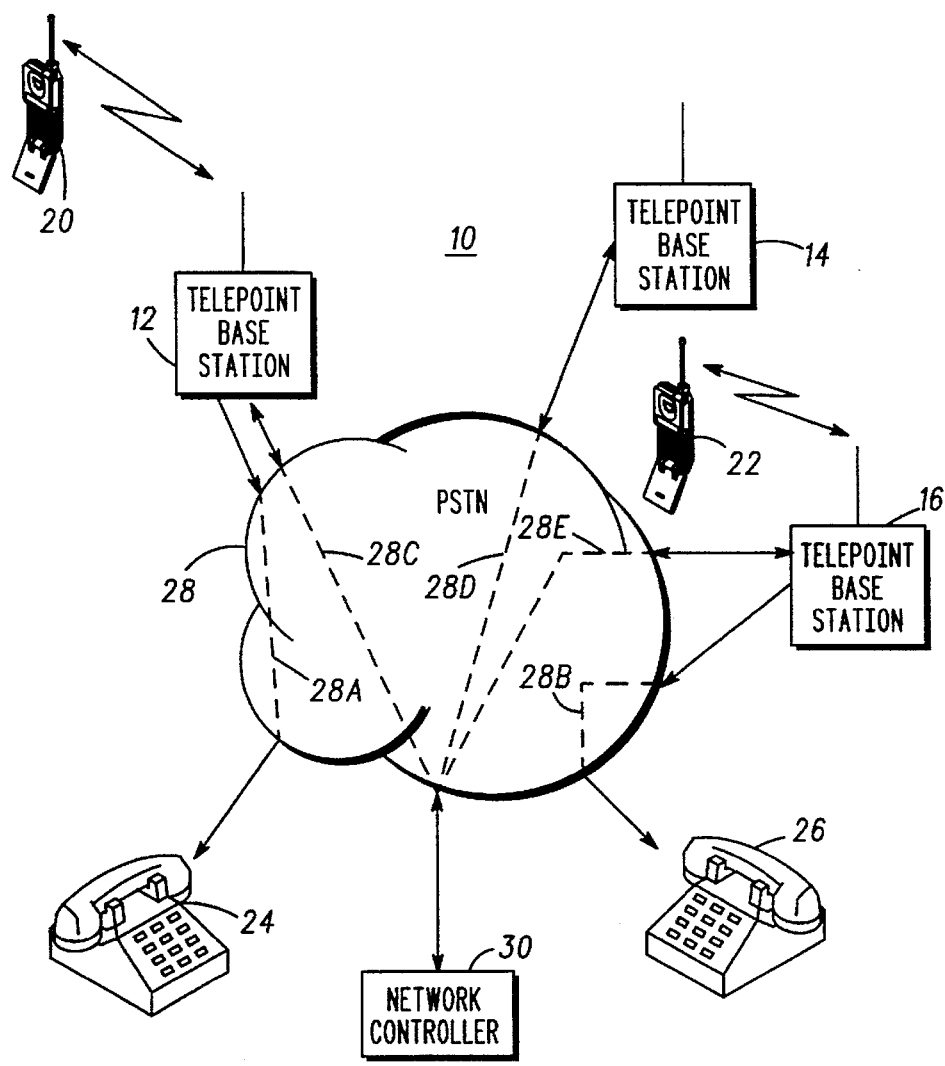
FIG. 1 is a diagram of a cordless telephone communications system in accordance with the present invention.

Referring to FIG. 1, a CT-2 (second generation cordless telephone) communication system 10 comprises multiple telepoint base stations 12, 14, 16, for allowing CT-2 handsets 20, 22 to place calls. The calls are routed to conventional telephones 24, 26 through connections 28a, 28b established through the public switched telephone network 28. For maintenance of the CT-2 communication system 10 and for billing of calls made by the handsets 20, 22, a network controller 30 communicates with the telepoint base stations 12, 14, and 16 via connections 28c, 28d, and 28e, respectively, established through the public switched telephone network 28.

Figure 2:
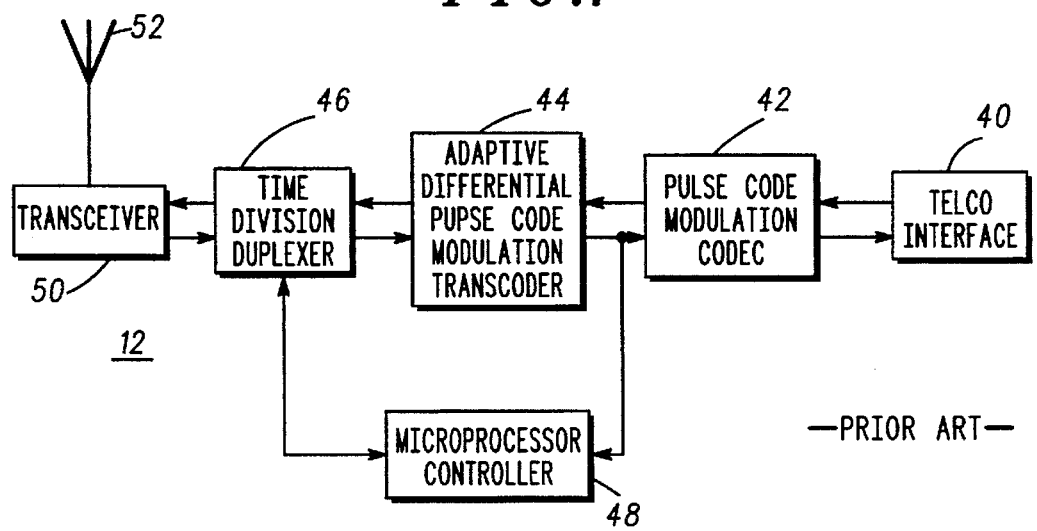
FIG. 2 is a block diagram of a prior art base station of the cordless telephone communications system of FIG. 1.

Referring to FIG. 2, a conventional CT-2 base station 12 is illustrated. According to the conventional CT-2 protocol, telephone signals are received and transmitted digitally in packets in a half-duplex or ping-pong scheme between a plurality of handsets 20, 22 (FIG. 1) and the base station 12. As used here, the term "signal" refers to a time-varying electrical signal, and the term "digital signal" refers to a series of digital samples of the signal. A "packet" includes a portion of the digital signal, or alternatively, a specified number of digital samples of the telephone signal, along with digital signalling bits.

A TELCO interface 40 is coupled to the public switched telephone network (PSTN) 28 (FIG. 1) for transmitting an analog signal thereto and for receiving an analog telephone signal therefrom. The TELCO interface 40 is coupled to a coder decoder, preferably in the form of a pulse code modulation (PCM) codec 42. The PCM codec 42 converts the analog signal received from the TELCO interface 40 to a digital signal and, conversely, converts a digital PCM signal to analog format. Functionally, the PCM codec 42 includes (a) an analog-to-digital converter (ADC) and bandpass filters for converting an analog telephone signal received from the TELCO interface 40 to a digital signal in the PCM format, and (b) a digital-to-analog converter (DAC) and lowpass filters for converting a digital signal to an analog telephone signal for provision to the TELCO interface 40.

The PCM codec 42 provides the digital signal in PCM format to an ADPCM transcoder 44. The adaptive differential pulse code modulation (ADPCM) encoder/decoder 44 includes two portions. The first portion of the ADPCM 44 is an ADPCM encoder for compressing the 64 kbps digital telephone signal to a 32 kbps ADPCM signal according to the G.721 standard specified by the International Telegraph and Telephone Consultative Committee (CCITT). The 32 kbps ADPCM signal is then provided from the ADPCM 44 to a time division duplexer 46.

The time division duplexer 46 combines signalling bits from a microprocessor controller 48 with the compressed digital data from the ADPCM transcoder 44 to form a CT-2 packet. The time division duplexer 46 provides the CT-2 packet to a radio transceiver 50 which modulates the signal and provides it as an RF signal to an antenna 52 for transmission to the handsets 20, 22 (FIG. 1). The modulation scheme is a two-level FSK shaped by an approximately Gaussian filter, as described in the CT-2 CAI Specification.

For reception, a packet from the CT-2 handset 20 is received as a modulated RF signal on the antenna 52. The transceiver 50 receives the RF signal and demodulates it to produce CT-2 packets. The packets are presented to the time division duplexer 46 which splits the packet into its two constituent components: signalling bits and a compressed digital signal. The time division duplexer 46 makes the signalling bits available to the microprocessor controller 48 and makes the compressed digital signal available to the second portion of the ADPCM transcoder 44, an ADPCM decoder. The controller 48 reads the signalling bits and performs associated conventional signalling functions in response thereto. The ADPCM decoder portion of the ADPCM 44 decompresses the compressed digital signal received from time division duplexer 46 in accordance with CCITT Recommendation G.721. The ADPCM transcoder converts the 32 kbps ADPCM digital signal to 64 kbps PCM according to standard G.721 ADPCM to form an digital signal. The digital signal is presented to the PCM codec 42 for decoding into an analog telephone signal and the analog telephone signal is presented to the TELCO interface 40.

Figure 3:
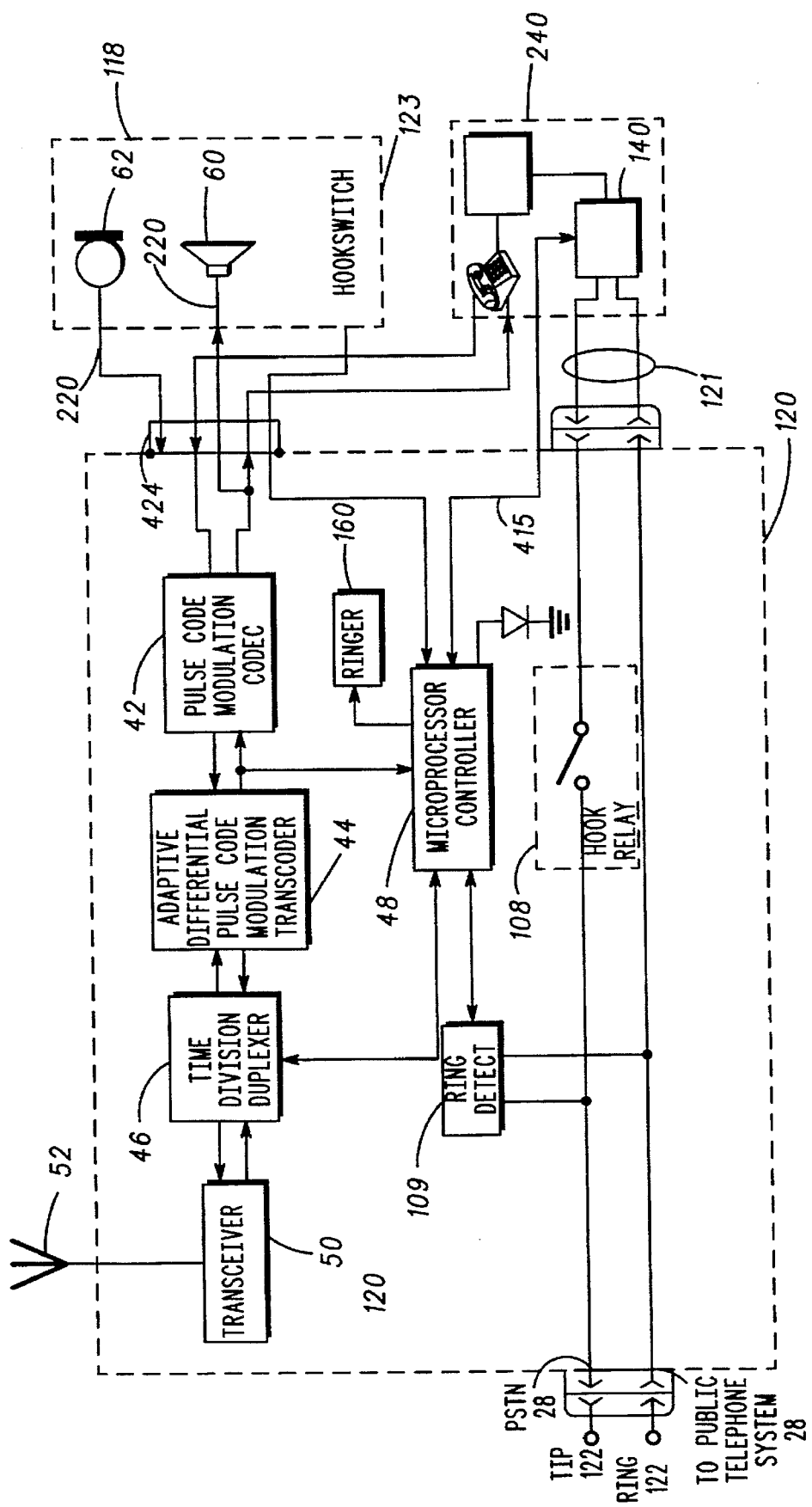
FIG. 3 is a block diagram of a base station of the communications system of FIG. 1 in accordance with the present invention.

Referring to FIG. 3, a telephone to CT-2 base converter 120 is shown installed with a conventional desk telephone 24 of FIG. 1. The telephone (desk or otherwise) includes a telephone base 240 with its conventional TELCO interface 140 for forming a new telepoint base station when connected to the converter 120. The converter 120 is connected to the TELCO interface 140 of the telephone base 240 through a conventional multileaded conductor 121 and the converter 120 is connected to a conventional telephone line through a similar multileaded conductor 122. Power is supplied to the converter 120 through a conventional AC cord and plug shown in FIG. 4. The converter 120 is then connectable to any telephone line which encompasses a tip and ring type pair through a telephone input and output port for accessing the TELCO interface 140 of the telephone base 240. In this manner, the converter 120 functions just like a conventional CT-2 base station of FIG. 2, except for not having an integral TELCO interface within a single unit.

For TELCO-less CT-2 base operation, the converter 120 includes a telephone port for flowing the pair of tip and ring lines 121 through and for connecting the converter to the separate telephone base's TELCO interface 140. Secondly, a PCM codec port 424 is included for providing access to a corded telephone handset 118, and for coupling the analog telephone signal from either the CT-2 base or corded handset to the same TELCO interface 140. Internal conventional circuitry of the separate telephone base 240, such as in a hybrid/duplexer, can transform tip and ring signals into analog telephone signals, and vice versa. Hence, for outgoing calls, the PCM codec port 424 couples the audio lines from the CODEC 42 to the corded handset port of the telephone base 240 which is internally connected to the TELCO port 140 of the telephone base for eventual connection to the wall (PSTN).

Both corded and cordless operation is provided with the addition of a tip and ring interceptor in the converter 120 to defeat the conventional tip and ring operation inside the telephone base 240. As is known, the conventional telephone 24 includes the corded telephone handset 118 having a corded microphone 62 and a corded speaker 60. In contrast to its usual connection, the corded telephone handset 118 is decoupled from the telephone base 240 for coupling to the CT-2 converter 120 with a wired cord 220. Hence, the converter 120 having the CT-2 transceiver 50 is connectable to the corded telephone handset 118 by the cord 220 and is also connectable to the phone input and output of the telephone base 240.

Figure 4:
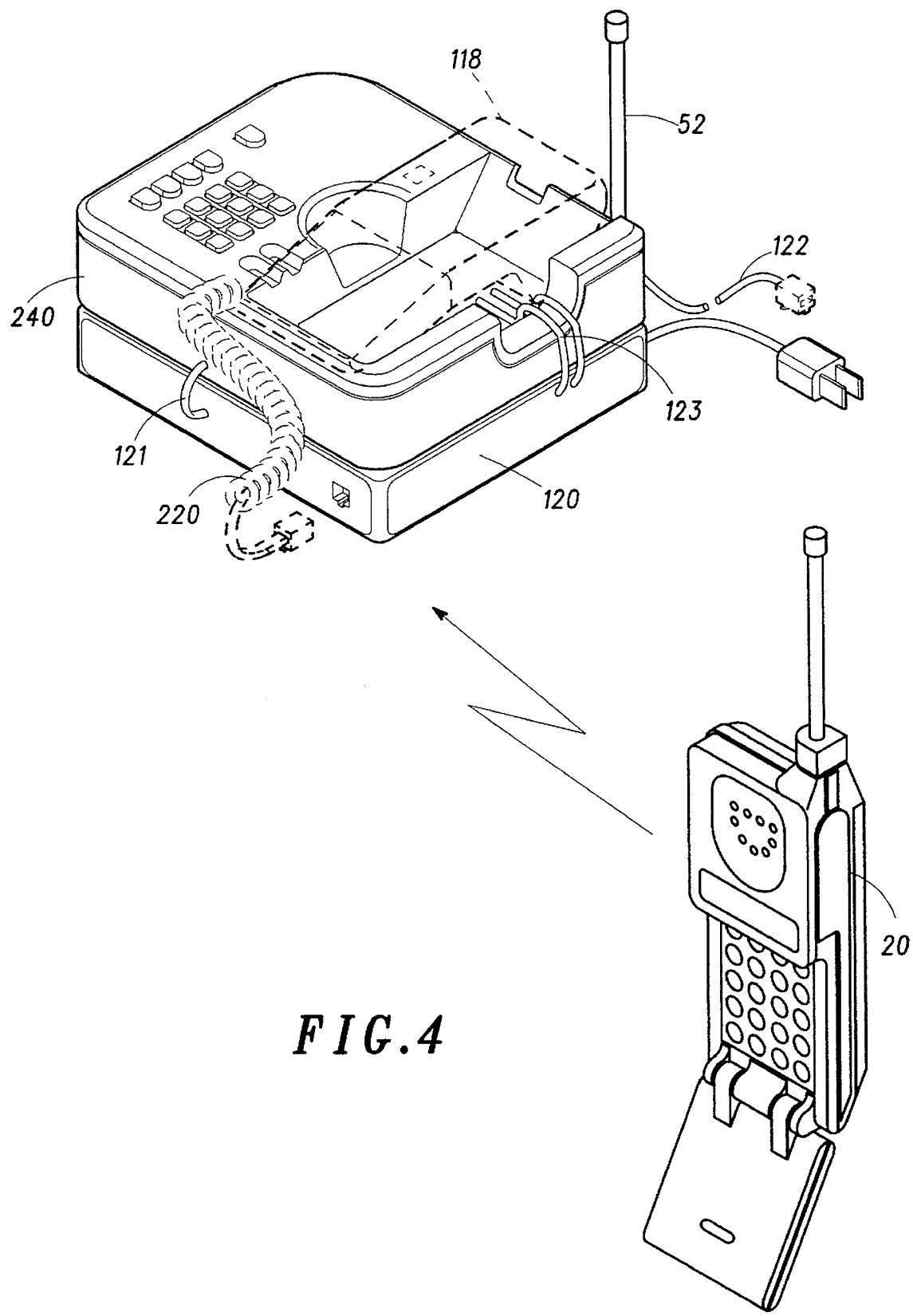
FIG. 4 is a diagram of a base station of the communications system of FIG. 1 in accordance with the present invention.

Because the corded handset 118 is no longer being cradled by the telephone base 240, a hook relay 108 of the converter 120 is connected to an ON/OFF hook cradle detector or hook-switch 123, as mechanically represented in FIG. 4. Since the original hook flash of the conventional phone is no longer engagible with the corded handset 118, the conventional off-hook detector in the conventional telephone base will always read OFF-hook as seen by the telephone base's internal circuitry. Thus, in accordance with the present invention, the converter 120 controls a ring detect circuit 109 and an off-hook relay circuit 108 for the ON/OFF hook functions of the converter.

Hence, according to the teachings of the present invention, through the telephone line 122, the tip and ring signals are received from an external source to be made available to either or both corded and cordless handsets. The ring detect circuit 109 connected across the tip and ring lines of the telephone line 122 detects a high voltage ring signal on those lines and outputs a ring detect signal having a logic level to the microprocessor 48. The ring detect circuit 109 may have either current sensing or voltage sensing circuitry and when activated, generates a control signal to microprocessor 48 to wait for an off-hook detect signal before conventionally enabling the receiving of an incoming call.

When a ring detect signal is received by the microprocessor 48, the microprocessor causes both an audio ring to be sounded in a ringer or convential speakerphone 160 of the converter 120 and a radio frequency (RF) signal to be transmitted. The antenna 52 of the converter 120 transmits the RF ringing representation signal for causing a CT-2 handset 20 to ring. Afterwards, the microprocessor 48 of the converter 120 waits for any OFF-hook representation detect signal. This OFF-hook detect representation signal can be caused by either a mechanical pick-up of the corded handset or caused by an RF electrical representation of the pick-up of the wireless handset. As is conventionally accomplished, electrically generated OFF-hook signal representation in the form of radio frequency signals can be transmitted by the CT-2 handset 20 and received by the CT-2 transceiver.

In this manner, the mechanical function which is normally performed by a hook-switch in a conventional landline telephone is additionally performed in the converter 120 of the present invention. As is known, the hook relay 108 may be a conventional solid state relay switch.

Referring to FIGS. 3 and 4, a pressure sensitive or otherwise sensitive cradle hook-switch sensor or detector 123 connected to the converter 120 supports the corded handset 118 in its resting position. A direct current (DC) circuit is made or broken by the hook-switch 123 to ground and the OFF-hook-detect signal is applied to the microprocessor 48 when the corded handset 118 is lifted up from the cradle 123. Thus, this sensor and circuit combination provides an ON/OFF hook detector engagible with the corded telephone handset 118 for producing a mechanically generated OFF-hook signal in the converter when the handset is lifted away from the detector 123 and for producing a mechanically generated ON-hook signal in the converter when the handset is in engagement with the detector. Subsequently, a hook-relay 108 activated by the microprocessor 48 response to a suitable OFF-hook signal, no matter how generated, energizes the telephone line by closing the relay for enabling the placement of the call. Since the CT-2 converter is also connected and operating, the telephone call may also be transmitted and heard by the wireless handset 20.

Specifically, when the appropriate off-hook signal is detected from either the corded or wireless handset, the microprocessor 48 outputs a logic level to the off hook relay 108 that lowers the impedance between the tip and ring lines of the telephone line, through the TELCO interface 140, in order to simulate an off-hook condition. Signals on the tip and ring lines are then coupled to the telephone handset as controlled by the microprocessor 48 and transmitted to the wireless handset 20. This process is similar in the reverse for placing a call from the corded or the cordless handset.

Alternatively, the converter 120 may have additional circuitry and/or software, aside from the conventional CT-2 base operation, for differentiating the detection of an off-hook signal by the wired or by the wireless handset and for suppressing the CT-2 transmission path to allow corded telephone handset operation only in response to the detection of the differentiated off hook signal representing a corded handset pick-up. This alternative is described to simplify the path description from dual parallel paths to a singular path.

In this software option, continued cordless CT-2 base transceiver operation is provided in response to the detection of the electrically OFF-hook signal representation received from the CT-2 handset 20 by the CT-2 transceiver, as conventionally accomplished, and in response to a nondetection of the mechanically generated OFF-hook signal.

Hence, to accomplish singular path selection, the microprocessor 48 of the converter activates the corded microphone 62 and the corded speaker 60 only in response to the occurrence of the mechanically generated OFF-hook signal from the hookswitch 123 and activates the transmit and receive RF link of the CT-2 transceiver 50 with the CT-2 handset only in response to the occurrence of the mechanical ON-hook signal and the received RF signal representing an OFF-hook situation from the CT-2 handset.

Then, depending on whether the corded 118 or wireless 20 handset is picked up, for communication during a placed call, the microprocessor 48 selects either the analog output processed and received from the CT-2 wireless handset 20 as coupled to the CODEC 42 or an audio output from the microphone 62 as the input to the telephone line 122 through the TELCO interface 140 and the energized tip and ring lines through the converter 120. Correspondingly, the microprocessor 48 selects either the transmission path from the CODEC 42 to the speaker of the wireless handset 20 or the corded speaker 60 as the audio output of the telephone line through the TELCO interface 140 via the internal phone circuitry of the telephone base 240. Otherwise, both corded and wireless paths are enabled and corded phone conversations are also transmitted to the wireless handset through the parallel transmit and receive audio lines of FIG. 5.

Figure 5:
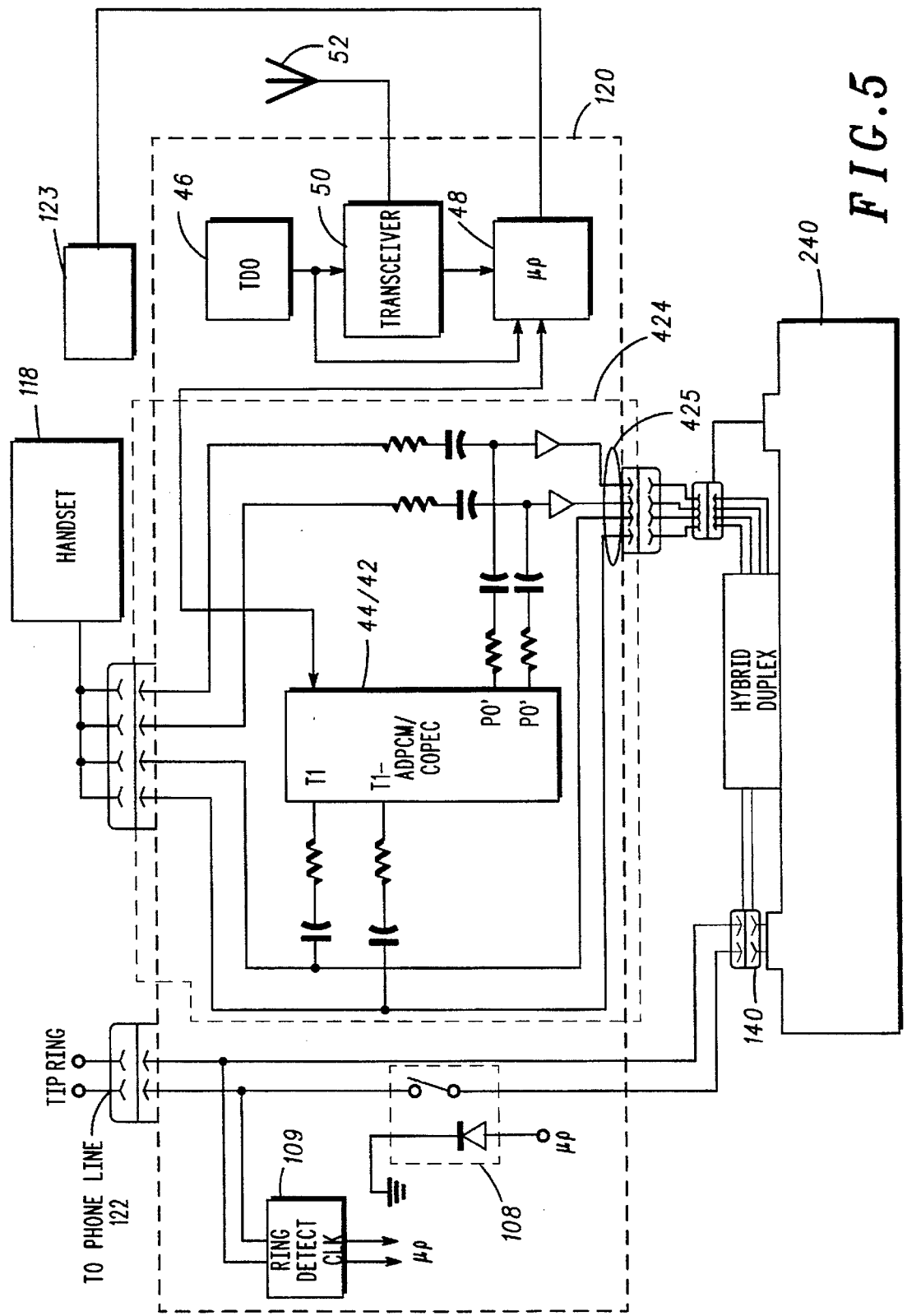
FIG. 5 is a block diagram of a base station of the communications system of FIG. 1 in accordance with the present invention.

For differentiating the detection of an OFF-hook signal by the wired or by the wireless handset and for suppressing the appropriate path accordingly, a data bus 415 is used by the converter 120 to sense if a corded telephone set is plugged into the converter 120. The microprocessor 48 detects the presence of the external TELCO interface 140 and the status of the OFF-hook signal or ON-hook signal by monitoring the OFF/ON hook detector or relay 108. The OFF/ON hook signal is converted to an appropriate binary signal having a binary state indicating whether or not the corded handset 118 is lifted or not (i.e., binary zero state=lifted off). If the corded handset 118 is not lifted and the electrically generated off-hook signal is received, the corded speaker 60 and corded microphone 62 are disabled and the only the transmitter (Tx) audio and receiver (Rx) audio lines 425 of FIG. 5 are routed to the CT-2 circuitry of the CT-2 converter 120 for processing and coupling to the wireless microphone and speaker of the CT-2 handset 20.

Thus, when the mechanically generated OFF-hook signal is detected by the microprocessor 48, the microprocessor 48 in the converter 120 will select the audio path between the TELCO interface 140 and the audio outputs of the corded microphone 62 and the corded speaker 60 of the corded handset 118, as in a conventional telephone circuit.

If the mechanically generated off-hook signal is not detected but the electrically generated one is detected, the audio output of the telephone (TELCO) interface is connected to the inputs of a voice storage unit, such as of the adaptive differential pulse code modulation (ADPCM) type.

Continuing with the premise that only the electrically OFF-hook signal is detected, representing a mechanically ON-hook status, a CT-2 digital path will be automatically selected by the microprocessor 48. The CT-2 converter or adaptor 120 then intercepts the normal connection between the TELCO interface 140 of a conventional corded telephone 24 and the public switched telephone network (PSTN) 28 (FIG. 1) for transmitting an analog signal thereto and for receiving an analog telephone signal therefrom. The TELCO interface 140 is thus coupled by internal conventional phone circuitry to the pulse code modulation (PCM) codec 42 in the converter 120.

The PCM codec 42 converts the analog telephone signal received from the TELCO interface 140 to a digital signal and, conversely, converts a digital PCM signal to analog format, for provision to the TELCO interface 140.

For CT2 base operation, the controller 48 reads the signalling bits and performs associated conventional signalling functions in response thereto. For example in response to the read signalling bits, the controller 48 performs a call setup or a disconnect and alternatively, can also select the audio path to the TELCO interface 140, bypassing the conventional audio path to the corded handset 118, regardless of whether the OFF-hook signal was detected or not. Finally, an analog signal is presented to the PCM codec 42 for encoding into an analog telephone signal and the analog telephone signal is presented to the TELCO interface 140.

For voice transmission to the wireless handset 20, the TELCO interface 140 is coupled to the PCM codec 42 for providing an analog signal thereto. The transmission path processes the signal through the PCM codec 42, the ADPCM transcoder 44, the TDD 46, and the transmitter portion of the transceiver 50 for RF transmission from the antenna 52.

The CT-2 converter or adaptor 120 thus intercepts the normal connection between the TELCO interface 40 of a conventional corded telephone 24 and the public switched telephone network (PSTN) 28 (FIG. 1) for transmitting an analog signal thereto and for receiving an analog telephone signal therefrom.

In summary, the converter incorporates all the elements of the conventional base station of FIG. 2, except for the integral TELCO interface. A separate TELCO interface is made accessible to the converter through telephone ports which are connected to a conventional telephone.

What is claimed is:

1. A CT-2 base telephone converter comprising:

a CT-2 transceiver for receiving a modulated RF signal and for demodulating the signal to produce CT-2 packets;

a time division duplexer for splitting the packets into signalling bits and a compressed ADPCM digital signal;

a controller for receiving the signalling bits from the time division duplexer, reading the signalling bits, and performing associated conventional signalling functions in response thereto;

an ADPCM transcoder for receiving the compressed ADPCM digital signal from the time division duplexer and decompressing the ADPCM digital signal to form a digital signal;

a PCM codec for receiving the digital signal for decoding the digital signal into an analog telephone signal;

a telephone port having a pair of tip and ring lines for connecting the tip and ring lines to a separate telephone base having a TELCO interface; and a PCM codec port for coupling the analog telephone signal to a wired handset port of the separate telephone base having internal connections to the TELCO interface, wherein the analog telephone signal is coupled via the TELCO interface and the tip and ring lines of the telephone port to a PSTN.

2. The CT-2 base telephone converter for claim 1, further comprising a tip and ring interceptor for controlling the operation of the tip and ring lines.

3. The CT-2 converter of claim 2, wherein the tip and ring interceptor comprises a ring detector.

4. A CT-2 base telephone converter comprising:

a CT-2 transceiver for receiving a modulated RF signal and for demodulating the signal to produce CT-2 packets;

a time division duplexer for splitting the packets into signalling bits and a compressed ADPCM digital signal;

a controller for receiving the signalling bits from the time division duplexer, reading the signalling bits, and performing associated conventional signalling functions in response thereto;

an ADPCM transcoder for receiving the compressed ADPCM digital signal from the controller and decompressing the ADPCM digital signal to form a digital signal;

a PCM codec for receiving the digital signal for decoding the digital signal into an analog telephone signal;

a telephone port having a pair of tip and ring lines for connecting the tip and ring lines to a TELCO port of a separate telephone base having a TELCO interface; and a PCM codec port for coupling the analog telephone signal to a corded handset port of the telephone base, the telephone base having internal circuitry for coupling the corded handset port to the TELCO interface; and a tip and ring interceptor for controlling the operation of the tip and ring lines in response to an OFF-hook representation, wherein the analog telephone signal is coupled via the TELCO interface, the tip and ring lines of the telephone port and the tip and ring interceptor to a PSTN.

5. The CT-2 converter of claim 4, wherein the tip and ring interceptor comprises:

a ring-detect and hook relay phone circuitry controlled by the controller in response to an OFF-hook electrical signal from a wireless CT-2 handset.

6. The CT-2 converter of claim 4, wherein the tip and ring interceptor comprises:

an external hookswitch for cradling the corded handset and for providing an OFF-hook signal to the controller;

a ring-detect and hook relay phone circuitry controlled by the controller in response to the OFF-hook signal from the external hookswitch.

7. The CT-2 converter of claim 4, wherein the PCM codec port comprises parallel audio and receive lines for coupling the analog telephone signals to both the corded handset and to the corded handset port.

* * * * *

UNITED STATES PATENT AND TRADEMARK OFFICE
CERTIFICATE OF CORRECTION

PATENT NO. : 5,629,976
DATED : May 13, 1997
INVENTOR(S) : Loke et al.

It is certified that error appears in the above-identified patent and that said Letters Patent is hereby corrected as shown below:

On the title page insert item [73],

--Assignee: Motorola Inc., Schaumburg, IL--

On the title page under item [56], insert

--Attorney, Agent, or Firm - Daniel R. Callopy--

Signed and Sealed this

Twenty-eighth Day of April, 1998

Attest:

BRUCE LEHMAN

*Attesting Officer*     *Commissioner of Patents and Trademarks*